United States Patent [19]

Pollen et al.

[11] Patent Number: 4,999,828
[45] Date of Patent: Mar. 12, 1991

[54] RECORD CARRIER DECODER FOR MULTI-TRACK DATA PATTERNS INCLUDING ERROR PROTECTION DATA

[75] Inventors: Rudy W. J. Pollen; Martinus P. M. Bierhoff, both of Eindhoven, Netherlands

[73] Assignee: U.S. Philips Corporation, New York, N.Y.

[21] Appl. No.: 294,313

[22] Filed: Jan. 6, 1989

Related U.S. Application Data

[63] Continuation-in-part of Ser. No. 255,807, Oct. 11, 1988.

[30] Foreign Application Priority Data

Dec. 23, 1987 [NL] Netherlands .................... 8703109

[51] Int. Cl.$^5$ .......................... H04N 5/76; G11B 5/09
[52] U.S. Cl. ............................... 369/59; 360/53
[58] Field of Search ............. 369/59; 360/53; 371/39, 371/40, 44, 45

[56] References Cited

U.S. PATENT DOCUMENTS 4,477,903 10/1984 Immink et al. .................... 371/37.4

Primary Examiner—Vincent P. Canney
Attorney, Agent, or Firm—John F. Moran

[57] ABSTRACT

In a multi-track record carrier the data is stored in words which comprise an increased number of smybols as a result of added redundancy. In order to neutralize so-called burst errors, the symbols of a word are stored in a distributed manner, for example by interleaving. In the case of loss of track, a regrouped word may then actually consist of parts of two or more different words (i.e. words situated on several tracks). Decoding of such a word is prevented in practice in that a series of symbols are invalidated in the case of loss of track, for example by inversion or by means of an invalidity flag.

21 Claims, 2 Drawing Sheets

RECORD CARRIER DECODER FOR MULTI-TRACK DATA PATTERNS INCLUDING ERROR PROTECTION DATA

This is a continuation-in-part of application Ser. No. 255,807 filed Oct. 11, 1988.

BACKGROUND OF THE INVENTION

The invention relates to a decoding device for a record carrier having a multi-track digital data pattern includes error protection data wherein each data word comprises not only user symbols but also redundancy symbols. Successive data words are stored on the record carrier in a distributed manner in order to allow for correcting burst errors, there also being provided a detection mechanism for supplying pointer signals for suspect symbols. The decoding device comprising a memory for collecting all symbols of a data word and an error correction element which is fed by the memory in order to perform, if necessary and possible, up to a predetermined maximum number of corrections within a word while using the pointer signals, and to supply an excess signal in the case of an excessive number of errors, and also comprises a selectively activatable concealment element which is fed by the correction element in order to deactivate, under the control of the excess signal, a received, presumably irreparable user symbol on a user output. A known record carrier of this type is the socalled "Compact Disc" for the storage of high-quality audio, described in detail in Philips Technical Review, Vol. 40, No. 6 (1982), pp. 151–156 (system aspects) and 166–173 (error protection, and error masking/concealment). "Multi-track" is to be understood to mean herein a carrier for which there is provided a read element which can be displaced between two or more read positions by by displacement transversely of a relative direction of movement between the read element and the carrier, without reversal of the latter movement direction being necessary. For example, a disc can comprise a spiral track as well as a number of concentric tracks. A tape, for example a magnetic tape, may also comprise a plurality of parallel tracks. The same holds true for a drum. A further possibility is the case where successive tracks are diagonally adjacent on a track, such as is used in R-DAT recording (digital audio tape with a rotating head).

Error protection is usually realized on a word basis. Such a word consists of a suitably chosen number of symbols each comprising a uniform number of bits. Because a sub-set of the symbols is redundant, a code having symbol-correcting properties can be implemented. Such a code is usually systematic at the symbol level, but that is not a requirement. The use of record carriers often involves the occurrence of so-called burst errors, which are due to the properties of the record carrier itself (material defects, scratches) as well as to faults during reading. Consequently, a series of successively read symbols may be unreliable: the error density can then easily exceed the correction capability of the code. In order to improve this situation, according to the cited publication the symbols which will ultimately form part of a single code word are stored on the record carrier in a distributed manner. After reading, the distribution is cancelled before correction is initiated. As a result, the symbols of a burst which is not excessively long will be distributed among a number of code words in such way that the error is eventually correctible.

For many symbol-correcting codes the number of symbols to be corrected per code word (t) at the most equals half the number of redundant symbols. In particular cases, this number is found to be too low.

European Patent Application 84913, which corresponds to U.S. Pat. No. 4,477,903, discloses a detection mechanism which forms pointer signals for suspect symbols. When use is made of such erase symbols indicated as being unreliable, the number of erase symbols e to be corrected per code word at the most equals the number of redundant symbols. If the latter number is, for example 4, the following situations may occur; each line indicating a case that can be converted to a correct code word.

$t = e = 0$
$t = 0, e = 1$
$t = 0, e = 2$
$t = 0, e = 3$
$t = 0, e = 4$
$t = 1, e = 0$
$t = 1, e = 1$
$t = 1, e = 2$
$t = 2, e = 0$.

Notably if the number of erase symbols amounts to 3 or 4, additional correction will not be possible. If the number of erase symbols amounts to 4, it is even impossible to detect whether the correction has been correctly executed or not. In some cases this detection will be omitted for $e = 3$, but even if that is not the case, a further error will be overlooked in approximately $\frac{1}{2}\%$ ($=1/256$) of the cases for an 8-bit symbol. Such an overlook can also occur with a different probability in other cases.

SUMMARY OF THE INVENTION

Among other things, it is an object of the invention to provide the separate detection of a loss of track where, when the distribution of the symbols of a word is cancelled, such as by deinterleaving, and the decoding device could constitute a word from symbols relating to various original code words which constituted word would have a non-excessive number characterizations of symbols as being suspect per se, and the signalling of such a loss of track to the decoding device, without either a complex microprogram facility being required for this purpose, in view of the temporary storage in the memory, or necessitating the deactivation of an excessively large part of the user data, while still reducing the above risk of overlooking a non-correctable error pattern substantially.

According to a first aspect of the invention, there is provided a decoding device which is characterized in that there is provided a detector for detecting a loss of track signal formed by a read element and for invalidating, in response thereto, a series of symbols supplied by the read element for an input of the memory in order to create an increased number of errors within a data word and to supply upon reception of a sufficient number of invalid symbols whether measured or artificial, also the excess signal which holds for all symbols of the relevant word.

FURTHER ASPECTS OF THE INVENTION

The error protection organization of the compact disc involves two interleaved Reed-Solomon codes. At the first level, a code word comprises 28 data symbols and 4 redundancy symbols, so that the minimum distance as taken over the symbols amounts to five. For this purpose various correction strategies may be used. If the strategy fails, all symbols of the relevant code word are deemed to be "suspect" (1 flag per symbol or a specific indication for the entire word, these indication possibily having a range of more than two values). Subsequently, the 28 data symbols are de-interleaved over as many code words of the second level. At this second level a code word (or block) comprises 24 user symbols and 4 redundancy symbols. Various correction strategies may again be used, utilizing the characterization "suspect symbol"; this characterization, bivalent or multivalent can act as an error locator, so that it is merely necessary to determine the error value. This takes place notably when the number of suspect symbols amounts to 3 or 4 in the above case, because the minimum distance of the code is insufficient for performing adequate correction in that case without using these error locators. In many cases no subsequent check will be possible concerning proper correction: in fact, in some cases good symbols could be changed to incorrect ones. When error locators are used extensively, in most cases the syndrome will then be automatically equal to zero.

Notably when used in the Compact Disc system, the invention relates to a decoding device for a record carrier provided with a multi-track data pattern which includes error protection data wherein a first data word comprises, in addition to user symbols, first redundancy symbols, all symbols of a first word being interleaved among second words with an addition of second redundancy symbols, the decoding device comprising a memory for collecting all symbols of a second word, a first error correction element which communicates with the memory in order to execute, if necessary and possible, up to a predetermined maximum number of corrections within a second word, and to characterize the user symbols and first redundancy symbols of the relevant second word as being suspect by means of a pointer signal in the case of an excessive number of errors, the memory being adapted to receive, after de-interleaving, all symbols of a first word, there being provided a second error correction element which communicates with the memory in order to execute, if necessary and possible, up to a second predetermined maximum number of corrections within a first word, utilizing the pointer signals, and to supply an excess signal in the case of a second excessive number of errors, and also comprising a selectively activatable concealment element which is fed by the second correction element in order to deactivate, under the control of the excess signal, a received but irreparably disturbed user symbol on a user output, characterized in that there is provided a detector for detecting an a loss of track signal formed by a read element and for invalidating, in response thereto, a series of symbols delivered by the read element for an input of the memory, for creating an increased number of errors within a first data word, and for forming, upon reception of a sufficient number of invalid symbols, also the excess signal. The excess signal may be formed in various way. One particularly advantageous way is that flags from the first correction element are considered as preliminary, and in case the second correction element cannot cope with the flagged erasure symbols, their flags are hardened and given a definitive character. However, other strategies are possible just as well, Here, the indication is then performed by the first decoding operation. Alternatively, however, the pointer information is formed already by a preceding demodulation operation so that irrecognizable channel symbols are signalled to be suspect; in that case additional symbols can also be signalled to be suspect during the first decoding operation under the control of an excessive number of suspect symbols, i.e. the sum of the number of invalid symbols and the number of symbols signalled to be irrecognizable by the demodulation. In this case the use of the invention concerns notably the second code. In general, the first correction element may receive three kinds of non-conforming symbols:

a. normal error symbols that had not been signalled as suspect;
b. symbols that are accompanied by a signalization due to track loss;
c. symbols that are signalled as suspect by an earlier stage of the processing, such as the demodulation step.

The correction should treat each of the three categories in an appropriate way.

The invention also relates to a player comprising a decoding device of the described type, and also comprising positioning means for positioning a storage medium, drive means for driving the storage medium in the direction of a track along the read element, and user adaptation means for presenting user data on an output of the decoding device. Further attractive aspects of the invention will become apparent upon consideration of the description which follows.

BRIEF DESCRIPTION OF THE DRAWINGS

The invention will be described in detail hereinafter with reference to some Figures.

DESCRIPTION OF A DECODING DEVICE

Figure 1:
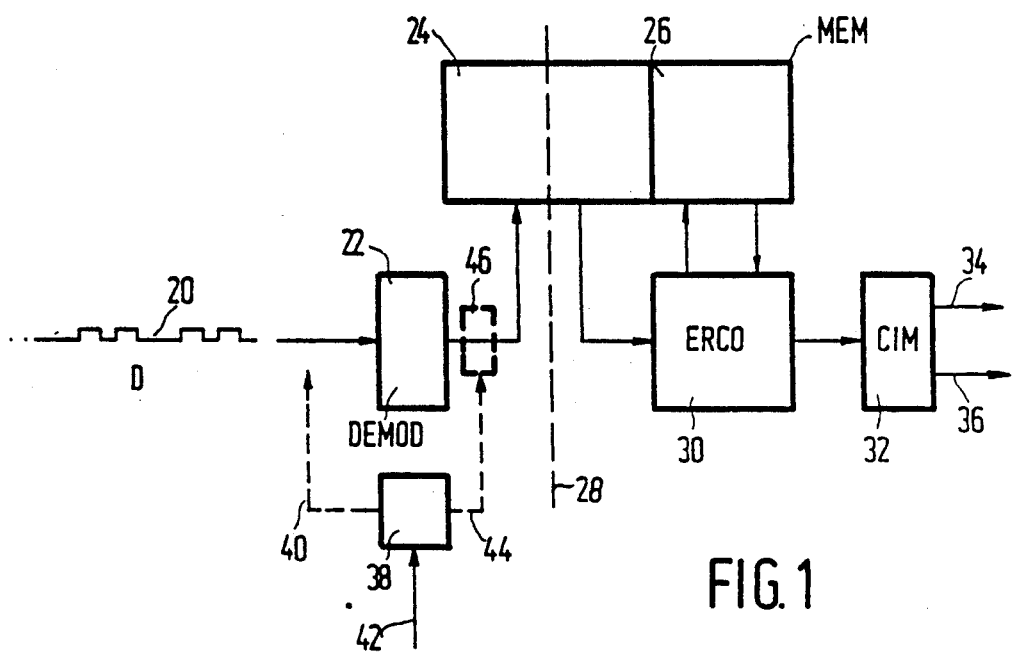
FIG. 1 diagrammatically shows a prior art device.

FIG. 1 diagrammatically shows a largely conventional device. The waveform 20 diagrammatically represents the incoming channel bits. These bits are produced by a read element (not shown) which reads a track. This track is typically scanned on a record carrier on which it is provided is driven along the read element. In many cases, there are also provided various servo mechanisms for correct positioning of the read element with respect to the track. To this end, there are provided one or more sensors which form part of the read element. The relevant control circuits themselves do not form part of the invention and have been omitted in FIG. 1 for the sake of simplicity. The stream of channel bits is self-synchronizing in that the distance between two successive signal transitions lies between a minimum value and a maximum value. Detection of these signal transitions produces an input clock signal by way of a phase-locked loop (PLL) and a voltage-controlled oscillator. The drive speed of the record carrier, and hence also the frequency of the input clock signals, is subject to fluctuations. Demodulator 22 is driven by the input clock signals. Therein the channel bits are converted into code symbols. The channel bits are arranged in a given pattern. First of all there is formed a synchronization pattern with which a so-called frame starts. This ;s followed by so-called sub-code data which is used for example for the organization at a higher level, such as addressing. Subsequently, there are 32 channel symbols of 14 channel bits each, each time separated by 3 spacing bits. The demodulator recognizes the synchronization pattern and subsequently selects the subcode data (output not shown), after which it delimits the channel symbols. Subsequently, each channel symbol is translated into an 8-bit code symbol. The code symbols are successively applied to the first-in first-out buffer (FIFO) 24, synchronized by the input clock signal. Buffer 24 serves notably to compensate for the fluctuations previously mentioned. At the right-hand side of the broken line 28, all operations are mutually synchronized by a local oscillator which is not shown for the sake of simplicity. The separating line between the two independent synchronizations, however, may also be situated elsewhere in the circuit. For example, the buffering in order to cancel irregularities in the data input rate can also be performed at the output side, just before the conversion of the digital data into analog sampling values. The buffer 24 is read by the decoding device 30 and the redundancy information is used for converting a code word having of 32 code symbols, using error protection (Reed-Solomon), into a word comprising 28 symbols. Subsequently, these 28 symbols are deinterleaved again over as many secondary code words of 28 symbols each. Subsequently, the redundancy information of each 28-symbol code word is used for converting the relevant code word into a 24-symbol data word of user information. For the intermediate storage of information there is provided a memory 26.

The redundancy described above can be used for the correction of symbols and for the repair of erase symbols by means of one of the described strategies. Correction means: localization and compensation. An erase symbol must be indicated and subsequently the error value can be determined. The indication is realized in that a symbol is characterized as suspect. This can be achieved in various ways:

(a) the demodulator receives a non-permissible pattern of channel bits (only approximately $2^8$ of the $2^{14}$ possiblities are permissible in view of the d,k limitations of the modulation rules). Characterization can be used in both decoding operations;

(b) the intensity of the high-frequency component of the read-out signal is out of certain prescribed limits;

(c) the self-synchronization as governed by a phase-locked loop signals produces an error:

(d) a track jump is signalled and an associated signalling is given to a sequence of symbols then received;

(e) during the first decoding operation, a code word is characterized as non-correctable; the correction fails, or the number of symbols characterized as suspect within the relevant code word is larger than four. In that case, for example, all symbols of the relevant code word can be characterized as being suspect.

In most cases a number of correctly decoded user symbols can be delivered by the second decoding operation. In certain circumstances, this will not be the case, that is to say if either after correction without use of pointer information an error location outside the word in ques(ion is found (thus a non-existent symbol), or if more than four symbols are signalled as suspect (in principle a possibility of incorrect correction without signalling exists, but this will be ignored). In the latter case the user symbols are applied to a concealment element 32 with an excess signal (per symbol, per word, etc.); the excess signal may be a copied version of a signalization by the first correction element, or may be generated by the second correction element itself: various strategies are possible. In concealment element 32 the excess signal is detected and a relevant user symbol is deactivated, for example it is replaced by 0 ... 0, or by an interpolated value. For audio applications the first step is usually not permissible; in that case an interpolation mechanism of some kind is provided. The simplest form is a linear interpolation between the last correct digital data prior to the disturbance upon reproduction and the first correct digital data after the disturbance. In given cases a higher-order interpolation can offer better results. In given cases the length of the disturbance is such that realistic interpolation is no longer possible. In that case the last correct digital data prior to the disturbance is retained (and hence the reproduction is repeated for so long) until the remaining length of the disturbance is small enough to allow an interpolation to be performed.

After the decoding and, in the case of a compact disc, after combination of each time two associated user symbols of 8 bits each, a stream of so-called 16-bit sampling values appears on the outputs 34, 36, which sampling values can produce a continuous audio signal after filtering and D/A conversion.

A complete circuit for the above is published, for example in Electronic Components and Applications, Vol. 6, No. 4, 1984, pp. 216-222.

PHENOMENA RELATING TO THE LEAVING OF A TRACK

FIGS. 2a-2f show, for the compact disc application, some data configurations which may occur when a track is left, so that another track is read at least temporarily.

Figure 2A:
FIGS. 2a-2f show a number of data configurations.

FIG. 2a diagrammatically illustrates the reading of the record carrier when the track is followed. Vertical bars represent each time the contents of a code word before the first decoding operation. Ignoring a comparatively small additional distribution mechanism (the so-called small interleave) of the compact disc, these bars are filled sequentially: first the bar n, then the bar n+1, then the bar n+2, and so on. The first decoding operation is then performed each time on such a bar.

Figure 2B:

FIG. 2b diagrammatically shows the situation after deinterleaving, an abstraction being made for the length of the code words. The code words (minus redundancY) of the first code can now be represented as slanted strips. The code words of the second code are now shown as vertical bars: they are represented by broken lines for the purpose of distinction.

Figure 2C:
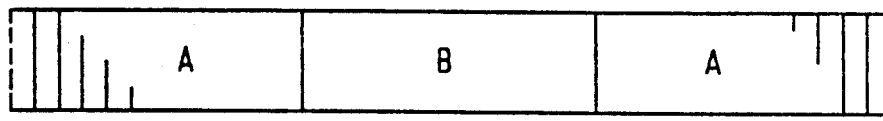

FIG. 2c diagrammatically shows the situation of FIG. 2a when a loss of track occurs, which is subsequently repaired: at the beginning and the end the track A is read and during an interval the track B is read (for example, an adjacent track). An abstraction is made for possible transitional phenomena where no channel symbols at all are received for a brief period of time (or no correct channel symbols which would be signalled as such by the demodulator 22). During the first decoding operation, the code words are decoded correctly, which means that the result will either be a correct code word or a disturbed code word on which a correct correction has been performed. A third possibility involves code word that cannot be decoded in the correct manner, but is also signalled as such. In the latter case all symbols thereof are signalled to be suspect by means of an additional signal (flag).

Figure 2D:
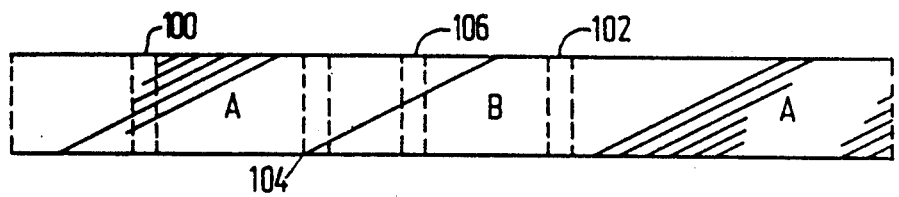

FIG. 2d is a diagrammatic representation of the situation of FIG. 2b in which the code words of the second decoding operation are shown (partly) as vertical bars. As regards the code word 100, the situation does not differ from that shown in FIG. 2b: it consists entirely of symbols of the track A. Similarly, the code word 102 consists entirely of symbols of the track B. Code word 104 consists mainly of symbols of the track A, the symbols of track B being so few that they can be considered to be error symbols; in that case correct decoding can still take place. Code word 106 no longer offers this possibility. Two possibilities now exist: if only a strategy involving error correction is followed (no erase symbols), most often the correction will fail. In that case the decoding device will form the excess signal, so that the concealment element will deactivate the relevant user symbols. When use is made of erase symbols in order to replace these symbols by a substitute symbol, the result of this strategy may be undesirable. This is notably so for the cases (t=0, e=4) and (t=1, e=2), because the correction capability is fullY ore nearly fully utilized It is also the case for (t=0, e=1, 2, 3) and (t=1, e=1) if the additional redundancy is not used to check whether the remaining syndrome becomes zero. In all these cases it may occur that an incorrectly corrected symbol is mistakenly not provided with an excess signal, so that it is not deactivated in given circumstances this may produce an annoying click in the audio signal stream. Another reason for using the track-loss signal to signal symbols for the first correction element as unreliable is the following. If the strategy in the second correction element is to forward in case of impossible correction only the input flags received, the track loss could have caused the first correction element to under-estimate the number of errors. The miscorrection could finally give rise to clicks. Raising the number of flagged symbols would to a large extent suppress these clicks.

Figure 2E:

FIG. 2e diagrammatically shows the situation of FIG. 2a where a loss of track occurs and a large number of tracks are successively detected. Such a situation will occur when another track is addressed; after the traversing of a number of tracks (as many as several hundreds of tracks or even more), the target track will ultimately be reached.

FIG. 2f again illustrates the situation of the FIGS. 2b, 2d. It will be evident that the situation of the code words may even become more complex, accompanied by an increased risk of errors.

Figure 2F:
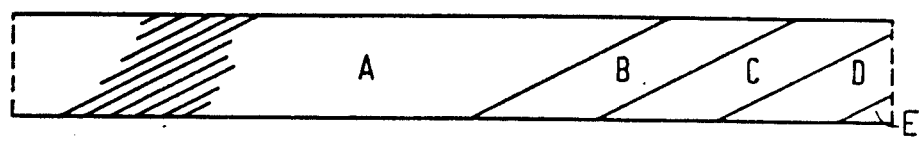

It is to be noted that in the FIGS. 2b, 2d, 2f the overlapping of successive tracks amounts to a number of 108 code words of 136μs each, which equals 15 ms. The risk of an audible error is thus substantial. This being the more so when the read element deliberately loses the track because of the addressing of another track.

In the case of a single-level code, analogous situations may occur. This can be represented as if no redundancy symbol were provided in code words of the first code, so that no correction could take place either.

STEPS IN THE CASE OF LOSS OF TRACK

Figure 3A:
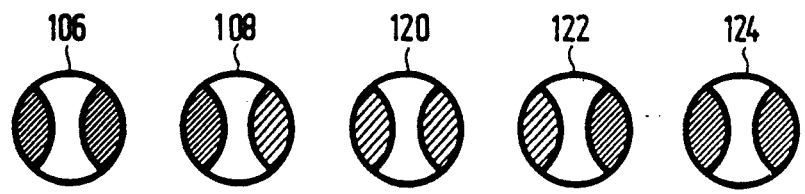
FIGS. 3a-3d illustrate some details of a correction device in accordance with the present invention.

FIGS. 3a–3d show some details of a correction device in accordance with the invention. FIG. 3a diagrammatically shows the position of two known photosensitive elements which are used for activating a control circuit for following a track. In the centered and focused position (120), both elements receive the same amount of energy which is produced by a read laser and which is reflected by the carrier. This energy depends on the position of the two objective lens with respect to the track: when positioning is correct, the photosensitive elements are symmetrically situated with respect to the track. The outer circle symbolizes the aperture of the objective lens. The hatching indicates the lighting intensity of an optical interference pattern of the zezoeth order light reflection and the ± 1$^{st}$ orders of light reflection as far as inside the aperture of the objective lens. Because of the optical properties of the track, the light intensities as measured on the two photosensitive elements are a direct indication of the correctness of the track-following position. Now, a heavier hatching indicates a higher received intensity. In the picture 122 positioning is to the right of the track: the left-hand read element still receives approximately the same amount of reflection, but the right-hand read member receives much more. This is symbolized by additional shading. In the picture 124 (shifted further to the right) the left-hand read element also receives much ore light than in the correctly positioned position. In the case of a shift to the left with respect to the correct position (118, 116), the situation is reversed. In the case of an even greater excursion to the right or the left, the cycle is repeated. The reflection is reduced upon correct positioning in that the pits in the surface of the CD disc which contain information modulation and hence reduce the reflection.

For the above example it has been assumed !or the sake of simplicity that focusing is correct, so that the read element is situated at the correct distance from the surface of the CD disc. For the vertical position adjustment a separate control mechanism based on interferometry is present, but this is not discussed for brevity.

Figure 3B:
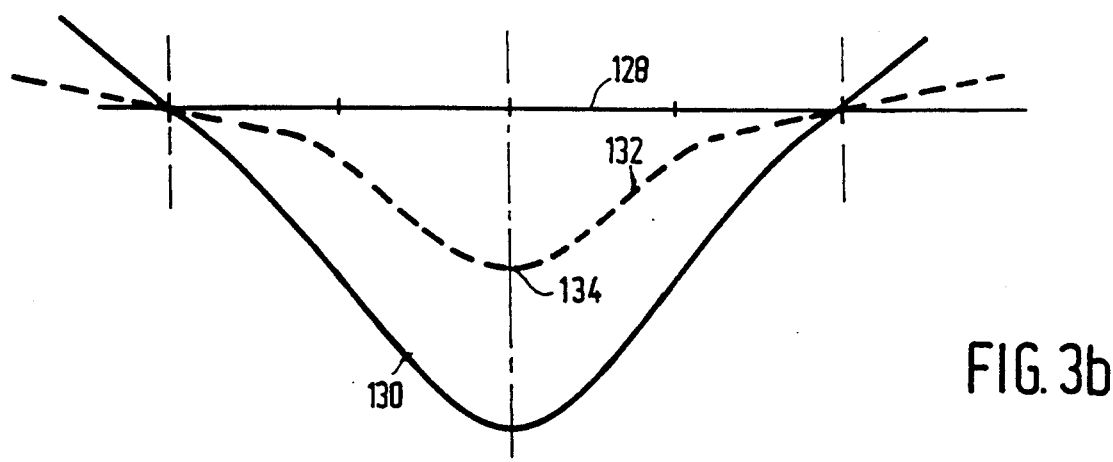

FIG. 3b shows the sum of the signals of the left-hand and right-hand elements as a function of the deviation; the horizontal line 128 represents the maximum reflection. The lower curve 130 represents the minimum reflection as a function of the deviation. In practice timevarying modulation takes place, so that on average the line 132 is found. Thus at point 134 the positioning is correct and the mean reflection is minimum.

Figure 3C:
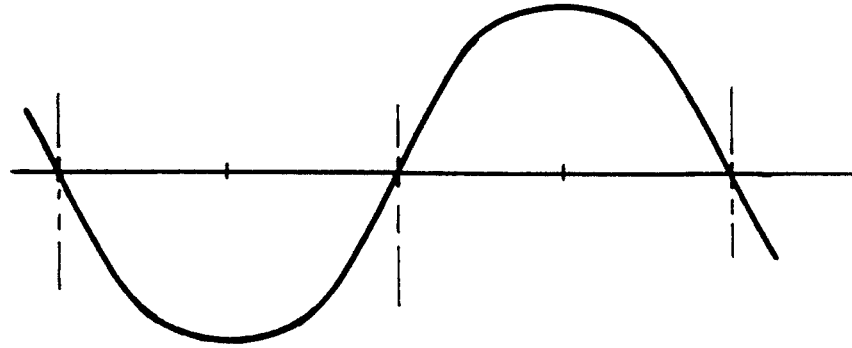

FIG. 3c similarly shows the difference between the signals of the left-hand and right-hand elements as a function of the deviation.

Figure 3D:
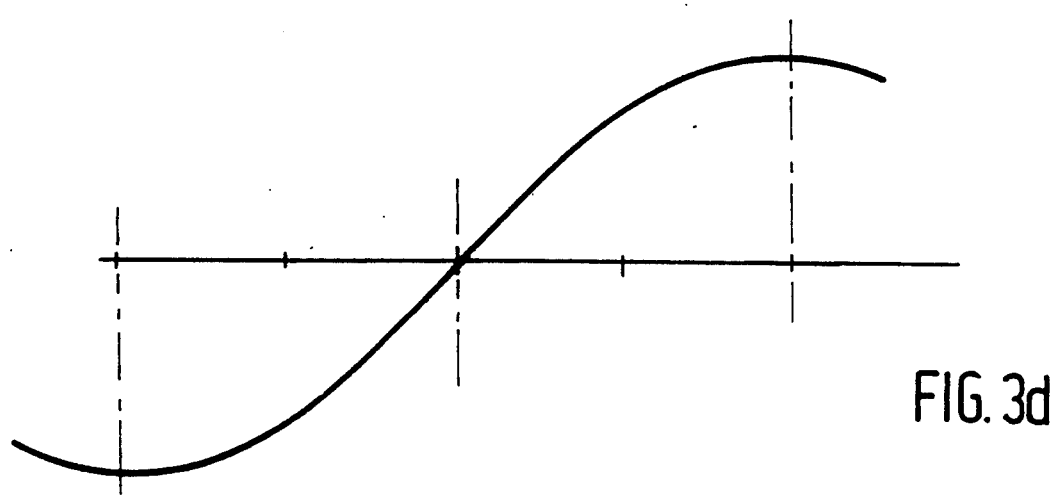

FIG. 3d shows the ratio of the signals of the FIGS. 3c and 3b. Thus, this signal is zero only if adjustment to a track has been achieved. The mathematical indefiniteness of 0/0 does not occur in practice, because an exactly stationary situation will never be reached, in combination with low-pass filter effects on the time-varying signals.

In the case of a temporary loss of track, the signal of FIG. 3d becomes unequal to zero and when temporary adjustment to another track takes place it becomes zero again. When the adjustment returns to the previous track, the sequence of the changes is reversed again. Upon reversal of the displacement direction to a track position, the sign of the time derivative of the signal 3d will change. This then also holds for the signal shown in FIG. 3c. When the sign of the displacement direction is reversed between two tracks, the sign of the derivative of the signal of FIG. 3c is reversed, but the derivative of the signal of FIG. 3d remains very small. Discrimination is thus possible between the adjustment to the previous track and the stepping across a number of tracks.

Furthermore, the number of reversals of the signal of FIG. 3d can be counted. If a command was given to address another track, for example by way of a step operation across a number of tracks, the number of zero crossings of the signal of FIG. 3d is counted. When this number reaches the correct value, the new track has been reached and the error correction can subsequently be resumed. The detector which detects that the read element is no longer or not yet positioned to the correct track, is denoted by the block 38 in FIG. 1. The broken line 40 represents the optical signals obtained in the manner described with reference to the FIGS. 3a-3d. The information of the control at a higher level, activating a transversal jump with respect to the tracks, is applied to the input 42; this may be a preset for a counter which counts the number of zero crossings of the curve shown in FIG. 3d and which, when the position -0- is reached, supplies a signal which indicates that the correct track has been reached. The control at a higher level detects, on the basis of an address present in the data read, whether this position actually concerns the correct track; the latter detection is always necessary, because selective addressing also takes place within one revolution on the basis of the data of the relevant track.

THE STEPS AT THE CODE LEVEL

On output 44, a signal appears which indicates that the read element is not positioned to a correct track. This signal can be used in various ways in order to ensure that the decoding does not initiate incorrect correction during the last decoding operation, which correction is based only on a comparatively small number of signals indicated to be unreliable. In this respect the following steps can be taken:

a. preferably, this signal is applied to block 46 which bit-wise inverts a decoded symbol. If the decoding device receives more than two invalid symbols per word, consequently, in the first decoding operation correct decoding can never be performed and this decoding will add a °suspect° flag to all symbols of a code word;

b. similarly, the same result can be obtained by a different modification of the output symbols of the demodulator. Examples in this respect are the partial inversion of the bits of a symbol, the replacement of a symbol by a predetermined symbol:

c. another possibility consists in that a symbol is modified in one way or another on the input of the demodulator 22;

d. a final possibility exists if the demodulator 22 comprises an output for indicating suspect symbols itself. If this number becomes larger than four per word, the first decoding operation Will not be performed for the relevant word. This flag can be formed in the same way as that described sub a. above; this is because the modification will usually produce an inadmissible channel word: for example, in that case the d,k constraint which limits the length of a string of equivalent channel bits will not be satisfied. The flag can alternatively be added directly by the signal on the line 44. In all these cases the output signal of the demodulator has a width of 9 bits;

e. if the decoding involves only one operation, several of the above methods can also be used. Another possibility is to replace each symbol by the same invalid symbol on the output of the demodulator, for example by the symbol FF(1111 1111) which is not allowed to occur in other situations. In the error detection, a special detector is provided for this symbol value so that the detection operates as an erase flag. If the correct track had not yet been reached, the number of erase flags will thus increase beyond the maximum permissible number, so that the relevant code word is considered to be incorrectable. When the correct track is reached, the generating of the dummy symbols is stopped, possibly after a fixed, small delay. Generally, the generating of correct user symbols is then resumed, so that the concealment device is deactivated.

The advantages of the invention are due to in the simplicity of its implementation: the symbols themselves memorize as if it were that they were situated in the vicinity of a loss of track. Notably no additional channel is required for such signalling, apart from an error flag, which may be associated with the symbol as an additional bit. The organization is simple notably in the case where it is not known how much time elapses between the reception of a symbol and its treatment by the error correction device 30. This is because there is an intermediate memory section 24 which operates as first-in-first-out buffer with a variable delay.

When use is made of a multi-level code, it is usually attractive to deactivate not only the first decoding operation but also the second decoding operation by means of the large number of invalid symbols and/or by the first decoding operation and/or by the symbols which are signalled to be suspect by the demodulation (element 46) in the case of loss of track.

A final step includes that, under the control of a sufficient number of invalid symbols per code word, the interpolation may be also deactivated when these code words appear on the user output.

What is claimed is:

1. A decoding device for a record carrier provided with a multi-track digital data pattern which includes error protection data wherein a data word includes not only user symbols but also redundancy symbols, successive data words being stored from the record carrier in a distributed manner in order to allow for correcting burst errors, there also being provided a detection mechanism for supplying pointer signals for suspect symbols, the decoding device comprising a memory for collecting all symbols of a data word and an error correction element which is fed by the memory in order to perform, if necessary and possible, up to a predetermined maximum number of corrections within a word while using said pointer signals, and to supply an excess signal in the case of an excessive number of errors, and the decoding device comprises a selectively activatable concealment element which is fed by the correction element in order to deactivate, under the control of the excess signal, a received, presumably irrepairable user symbol on a user output, the decoding device being provided a detector for detecting a loss of track signal formed by a read element and for invalidating, in response thereto, a series of symbols supplied by the read element for an input of the memory in order to create an increased number of errors within a data word and to supply, upon reception of a sufficient number of invalid symbols whether measured or artificial, also said excess signal holds for all symbols of the relevant word.

2. A decoding device for a record carrier provided with a multi-track data pattern which includes error protection data wherein a first data word comprises, in addition to user symbols, first redundancy symbols, all symbols of a first word being interleaved among second words with an addition of second redundancy symbols, the decoding device comprising a memory for collecting all symbols of a second word, a first error correction element which communicates with the memory in order to execute, if necessary and possible, up to a predetermined maximum number of correction within a second word, and to characterize the user symbols and first redundancy symbols of the relevant second word as being suspect by means of a pointer signal in the case of an excessive number of errors, the memory being adapted to receive, after de-interleaving, all symbols of a first word, there being provided a second error correction element which communicates with the memory in order to execute, if necessary and possible, up to a second predetermined maximum number of corrections within a first word, said pointer signals, and to supply an excess signal in the case of a second excessive number of errors, and also comprising a selectively activatable concealment element which is fed by the second correction element in order to deactivate, under the control of the excess signal, a received but irrepairably disturbed user symbol on a user output, the decoding device having a detector for detecting a loss of track signal formed by a read element and for invalidating, in response thereto, a series of sYmbols delivered by the read element for an input of the memory, for creating an increased number of errors within a first data word received, and for forming, upon reception of a sufficient number of invalid symbols, also said excess signal.

3. A decoding device as claimed in claim 1 or 2, characterized in that said invalidation is represented by a dummy symbol.

4. A decoding device as claimed in claim 1 or 2, characterized in that said invalidation is represented by an invalidity flag.

5. A decoding device as claimed in either claims 1 or 2, characterized in that said loss of track detector responds to a displacement command for the read element.

6. A decoding device as claimed in claim 5, characterized in that said invalidation is terminated by counting the number of track traversed by the read element until an intended track is reached.

7. A decoding device as claimed in claims 1 to 2, characterized in that said loss of track detector responds to a temporary loss of track by the read element with respect to a current track.

8. A decoding device as claimed in any one of the claims 1 to 2, characterized in that for the formation of an invalid symbol the decoding device comprises an inversion element for the at least partial inversion of a current symbol received.

9. A decoding device as claimed in any one of the claims 1 to 2, characterized in that the decoding device comprises a generator for providing a symbol of fixed value in order to form an invalid symbol.

10. A player comprising a decoding device as claimed in any one of the claims 1 to 2, and also comprising positioning means for positioning a storage medium, drive means for driving the storage medium in the direction of a track along said read element, and user adaptation means for presenting user information on an output of the decoding device.

11. A decoding device according to claim 3 wherein said loss of track detector responds to a displacement command for the read element.

12. A decoding device according to claim 4 wherein said loss of track detector responds to a displacement command for the read element.

13. A decoding device according to claim 3 wherein for the formation of an invalid symbol the decoding device comprises an inversion element for the at least partial inversion of a current received symbol.

14. A decoding device according to claim 4 wherein for the formation of an invalid symbol the decoding device comprises an inversion element for the at least partial inversion of a current received symbol.

15. A decoding device according to claim 5 wherein for the formation of an invalid symbol the decoding device comprises an inversion element for the at least partial inversion of a current received symbol.

16. A decoding device according to claim 6 wherein for the formation of an invalid symbol the decoding device comprises an inversion element for the at least partial inversion of a current received symbol.

17. A decoding device according to claim 7 wherein for the formation of an invalid symbol the decoding device comprises an inversion element for the at least partial inversion of a current received symbol.

18. A decoding device according to claim 3 wherein said loss of track detector responds to a temporary loss of track by the read element with respect to a current track.

19. A decoding device according to claim 4 wherein said loss of track detector responds to a temporary loss of track by the read element with respect to a current track.

20. A decoding device according to claim 5 wherein said loss of track detector responds to a temporary loss of track by the read element with respect to a current track.

21. A decoding device according to claim 6 wherein said loss of track detector responds to a temporary loss of track by the read element with respect to a current track.

* * * * *